(12) United States Patent
Ravichandran et al.

(10) Patent No.: US 12,391,125 B2
(45) Date of Patent: Aug. 19, 2025

(54) SYSTEM AND METHOD TO COORDINATE LASH CROSSING TRANSITIONS IN MULTI-AXLE ELECTRIFIED DRIVETRAINS

(71) Applicant: Ford Global Technologies, LLC, Dearborn, MI (US)

(72) Inventors: Maruthi Ravichandran, Dearborn, MI (US); Bhavesh Paradkar, Canton, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 18/045,242

(22) Filed: Oct. 10, 2022

(65) Prior Publication Data

US 2024/0116371 A1    Apr. 11, 2024

(51) Int. Cl.
*B60L 15/20* (2006.01)
*F16H 57/12* (2006.01)
*B25J 9/16* (2006.01)

(52) U.S. Cl.
CPC .......... *B60L 15/2036* (2013.01); *B60L 15/20* (2013.01); *F16H 57/12* (2013.01); *B25J 9/1641* (2013.01); *B60L 2240/421* (2013.01); *B60L 2240/423* (2013.01); *G05B 2219/41034* (2013.01);
(Continued)

(58) Field of Classification Search
CPC ..... B25J 9/1641; B60L 15/20; B60L 15/2036; B60L 15/32; B60L 2220/42; B60L 2240/421; B60L 2240/423; B60L 2270/14; F16H 57/12; F16H 2057/121; F16H 2057/122; F16H 57/123; F16H 57/126; G05B 19/404; G05B 2219/41032;
(Continued)

(56) References Cited

U.S. PATENT DOCUMENTS 6,266,597 B1    7/2001    Russell et al.
9,446,757 B2    9/2016    Liang et al.
9,873,422 B2    1/2018    Yamazaki et al.
(Continued)

OTHER PUBLICATIONS

Ravichandran, M. et al., "Clunk and Shuffle Management in Multi-Motor, Multi-Axle Electrified Drivetrains," U.S. Appl. No. 17/812,372, filed Jul. 13, 2022, 72 pages.

*Primary Examiner* — Angela Y Ortiz
*Assistant Examiner* — Aaron K McCullers
(74) *Attorney, Agent, or Firm* — David Kelley; McCoy Russell LLP

(57) ABSTRACT

Methods and systems are provided for an electric vehicle are provided. In one example, a method for an electric vehicle having a first prime mover for supplying a torque to a first axle and a second prime mover for supplying a torque to a second axle comprises transitioning the first prime mover and the second prime mover to cross a lash zone one before the other, where the lash zone of the second prime mover does not overlap with the lash zone of the first prime mover. In one example, the first prime mover is controlled with a first electronic controller and the second prime mover is controlled with a second electronic controller positioned separately in the vehicle from the first electronic controller. In one example, the method further comprises communicating information from the first electronic controller to the second electronic controller via a communication area network.

18 Claims, 8 Drawing Sheets

(52) U.S. Cl.
CPC .............. *G05B 2219/41265* (2013.01); *G05B 2219/43003* (2013.01)

(58) Field of Classification Search
CPC ........... G05B 2219/41034; G05B 2219/41265; G05B 2219/43003
USPC ....... 74/409; 409/5, 146; 701/22, 51, 52, 53, 701/54, 62, 69, 87
See application file for complete search history.

(56) References Cited

U.S. PATENT DOCUMENTS

| | | |
|---|---|---|
| 9,944,285 B2 | 4/2018 | Doan et al. |
| 2017/0327102 A1* | 11/2017 | Yamazaki ............. F02D 41/107 |
| 2017/0355362 A1 | 12/2017 | Reed et al. |
| 2018/0229714 A1 | 8/2018 | McCullough et al. |
| 2020/0039503 A1* | 2/2020 | Bowman ............... B60W 20/15 |
| 2020/0259431 A1* | 8/2020 | Sawada ................... H02P 21/18 |
| 2020/0269702 A1* | 8/2020 | Meyer ..................... B60L 50/15 |
| 2021/0023944 A1* | 1/2021 | Ravichandran .... B60K 23/0808 |

* cited by examiner

SYSTEM AND METHOD TO COORDINATE LASH CROSSING TRANSITIONS IN MULTI-AXLE ELECTRIFIED DRIVETRAINS

FIELD

The present subject matter relates to a system and a method for coordinating lash crossing and transitions in a multi-motor, multi-axle electrified drivetrain of a vehicle, particularly an electric vehicle.

BACKGROUND/SUMMARY

A drivetrain system of a vehicle, for example an electric vehicle, is connected to drive axles of the vehicle. In an example, the drivetrain system is connected to drive axles of the vehicle via a gear mesh. The drivetrain system transfers torque to wheels of the vehicle. During operation, the drivetrain systems may be affected by backlash and compliance making the torque transfer to the wheels difficult. The backlash or lash may be caused due to a clearance or a play between mating parts. In the drivetrain system, the backlash occurs due to a clearance between the rotating drivetrain components such as teeth of gears present in a transmission of the vehicle. Manufacturing tolerances, bearing dimensions, thermal considerations, and other practical considerations contribute to backlash. Other reasons are to leave space for lubricants, reduce friction in the gears, and/or allow for metal expansion. Compliance may occur due to the flexibility of the rotating drivetrain components such as flexibility of half-shafts In one example, if a step increase of torque or a step decrease of torque is applied by the actuator in response to the driver pressing the accelerator pedal or releasing the accelerator pedal, the backlash may be traversed rapidly. Such rapid traverse of the backlash may result in clunk and shuffle phenomena. Particularly, clunk (e.g., also called shunt) refers to a sensation of the teeth of gears caused upon contact after crossing the lash zone or the zero torque point. Shuffle refers to oscillations caused by the periodic twisting and untwisting of the shafts, for example, half-shafts. Shuffle oscillations may take place in the drivetrain systems even during the scenarios wherein the backlash is not traversed. The clunk is uncomfortable and may manifest as an audible noise in a frequency range of 1 kilohertz (kHz) to 5 kHz. The shuffle may manifest as a longitudinal vehicle jerking in a frequency range of 1 Hz to 15 Hz.

Other attempts to address clunk resulting from backlash include torque shaping through the lash zone. Russell and Kotwicki in U.S. Patent No. 62/666,597 teach a system and method for transitioning the lash zone based on a speed ratio estimate across a torque converter. When near the lash zone, engine torque may be adjusted at a predetermined rate until the system passes through the lash zone. Engine torque slowed down going through the lash zone in this way minimizes clunk by bringing the gear teeth into contact gently.

However, torque shaping to minimize clunk in dual motor vehicles with separate drivetrains is particularly challenging. One such drivetrain includes a 2-motor electric drivetrain having four-wheel drive capability, such as a 2-P4 electric drivetrain (2-P4 BEV), where a front motor is provided at a front axle, and a rear motor is provided at a rear axle. In some examples, during operation of a 2-P4 BEV drivetrain, differing amounts of the backlash affect the rear motor versus the front motor. In some examples, one of the two axles (front or rear) is equipped with a wheel-end disconnect (WED) hub, which may result in a larger amount of backlash. Further, differing amounts of the compliance in the rear half-shafts versus the front half-shafts, in some examples due to part-to-part manufacturing variations, or due to differences in rear axle versus front axle specifications and/or components, may contribute to clunk and shuffle. Moreover, for front and rear motors having distributed control, communication area network (CAN) communication delays between the rear motor controller and the front motor controller may contribute to clunk and shuffle in 2-motor electric vehicle configurations.

In one example, the issues identified by the inventors may be resolved by a method for an electric vehicle having a first prime mover for supplying a torque to a first axle and a second prime mover for supplying the torque to a second axle, comprising, transitioning the first prime mover and the second prime mover to cross a lash zone one before the other, where the lash zone of the second prime mover does not overlap with the lash zone of the first prime mover. In this way, by transitioning the first prime mover and the second prime mover through the lash sequentially, clunk and shuffle during torque reversals may be minimized and motor control more resilient to CAN communication delays.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
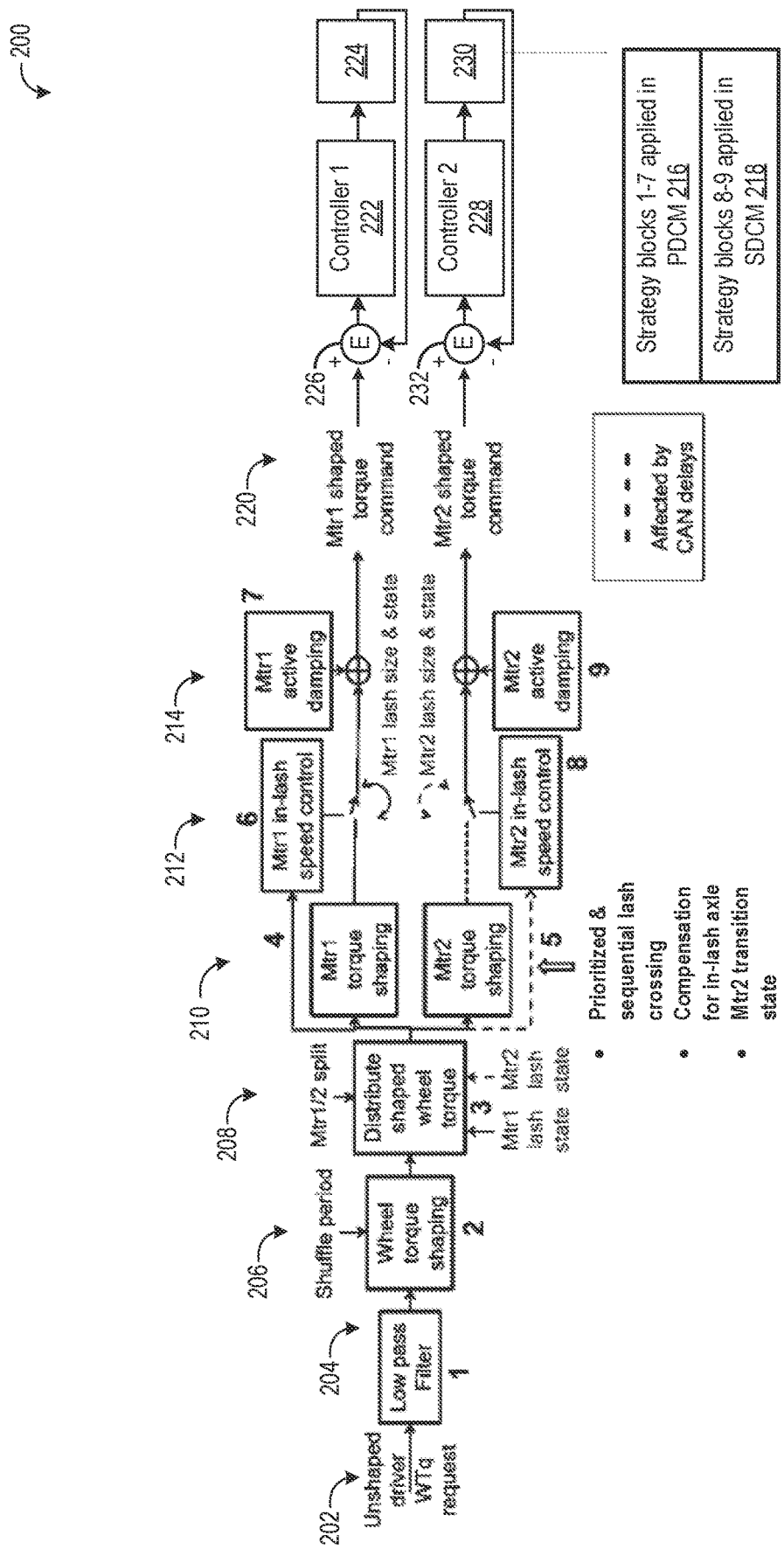
FIG. 2 is a block diagram of a coordinated torque shaping control system.
Figure 3:
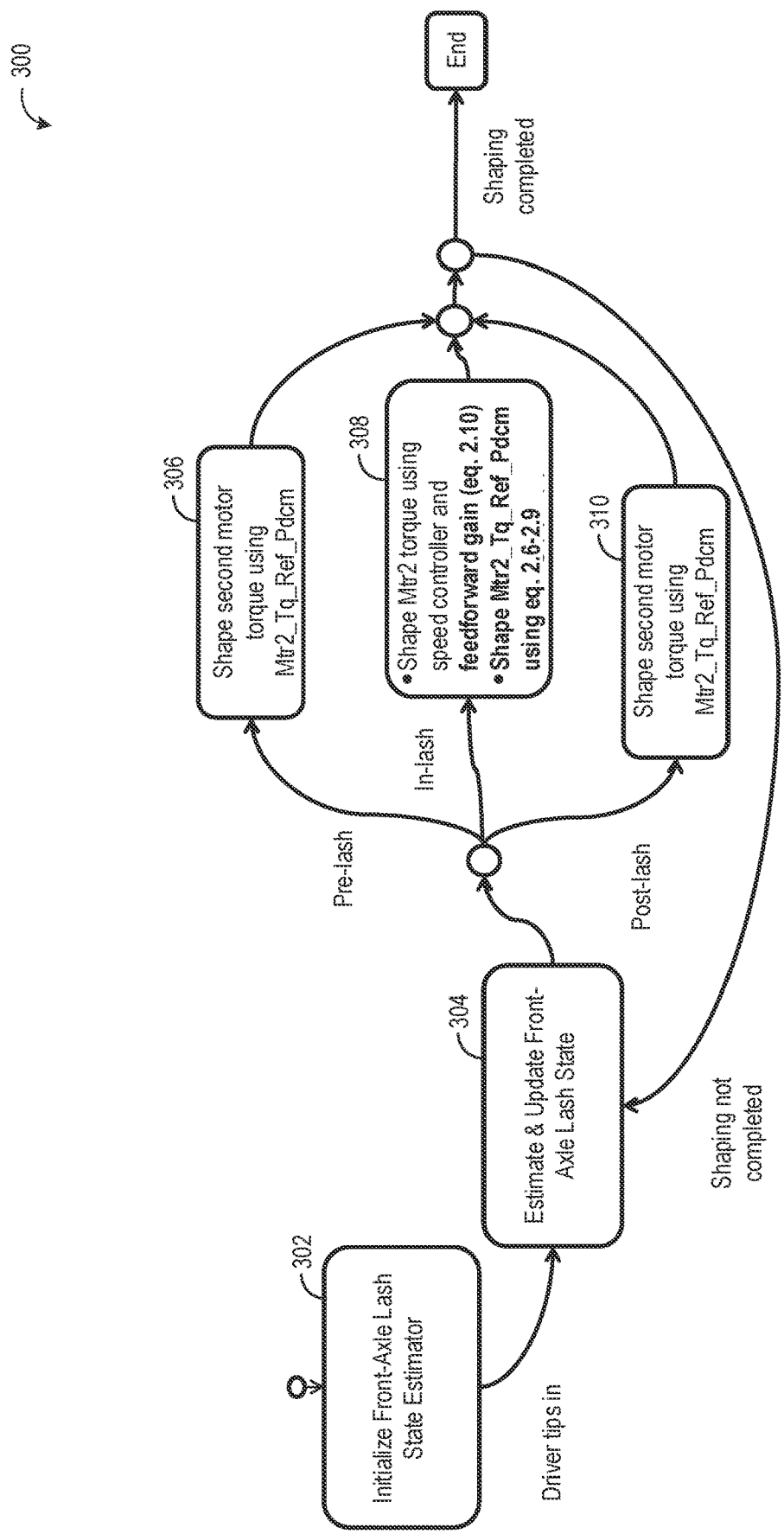
FIG. 3 is a state diagram based on the coordinated torque shaping control system, where the front motor torque may be shaped based on an estimated lash state.
Figure 4:
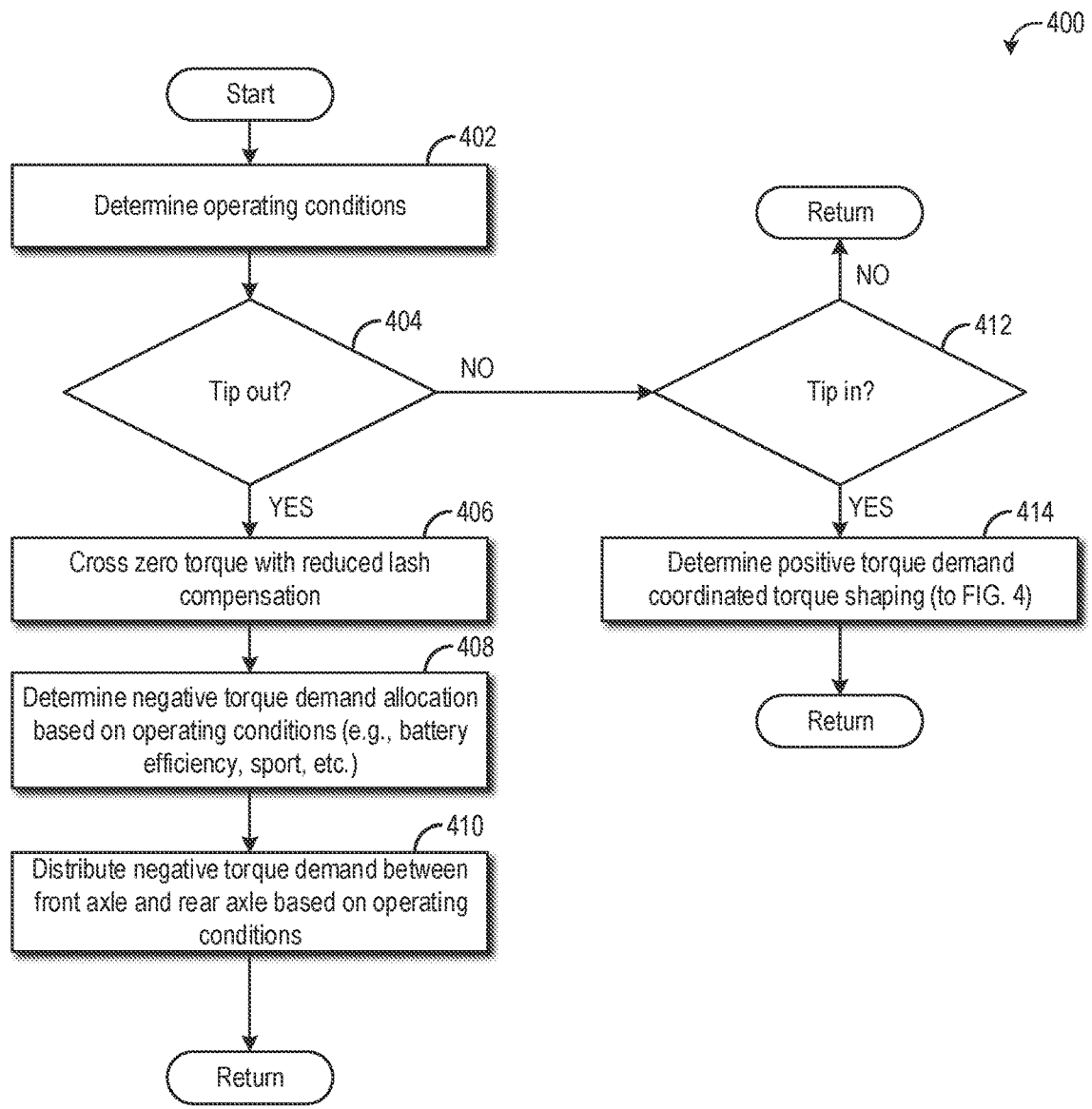
FIG. 4 is a flowchart illustrating a first example control routine for the coordinated torque shaping control system.
Figure 5:
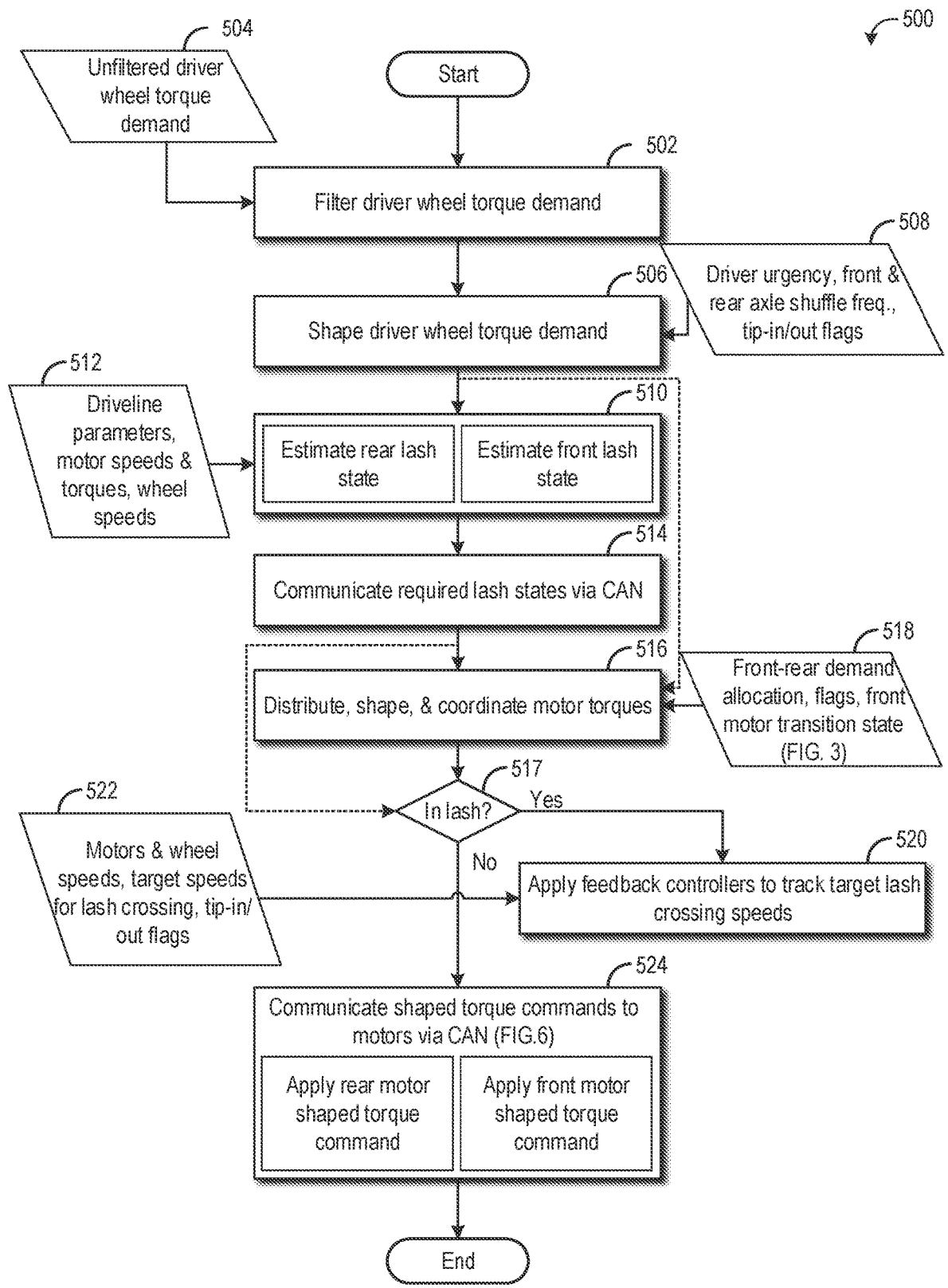
FIG. 5 is a flowchart illustrating a second example control routine for the coordinated torque shaping control system.
Figure 6:
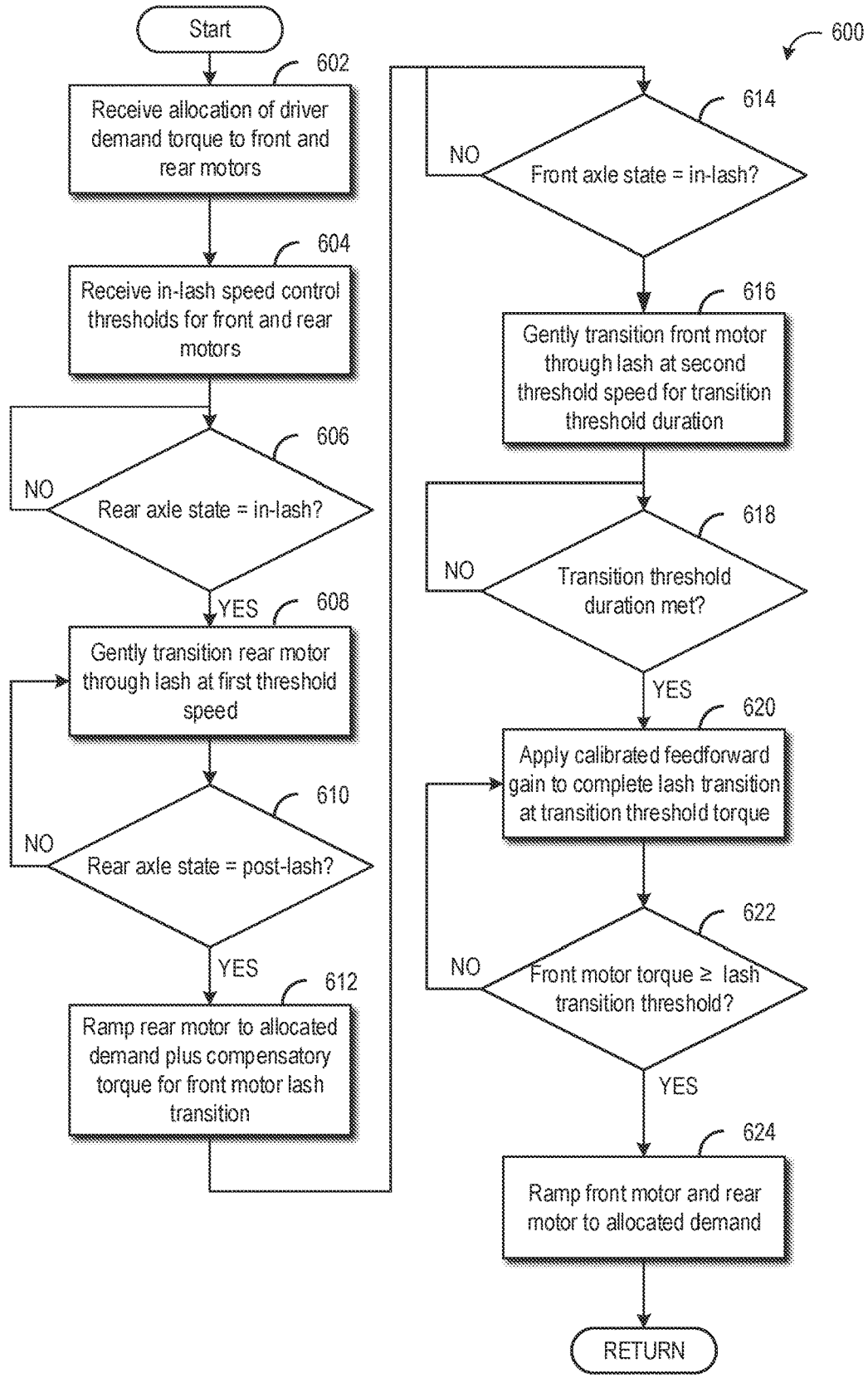
FIG. 6 is a flow chart illustrating a third example control routine for the coordinated torque shaping control system.
Figure 7:
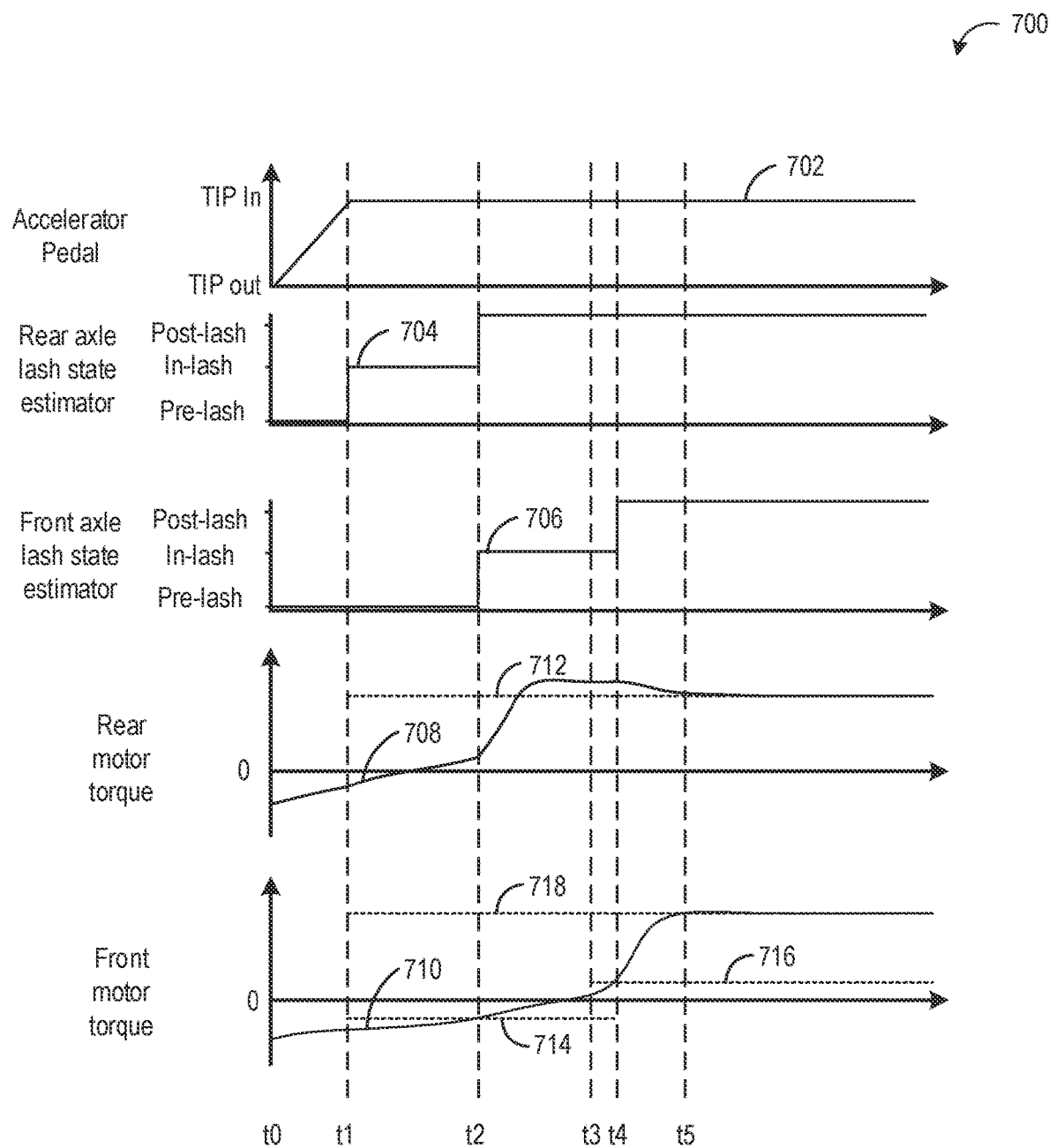
FIG. 7 is a timing diagram illustrating an example prophetic operation of the coordinated torque shaping control system for clunk and shuffle management.
Figure 8:
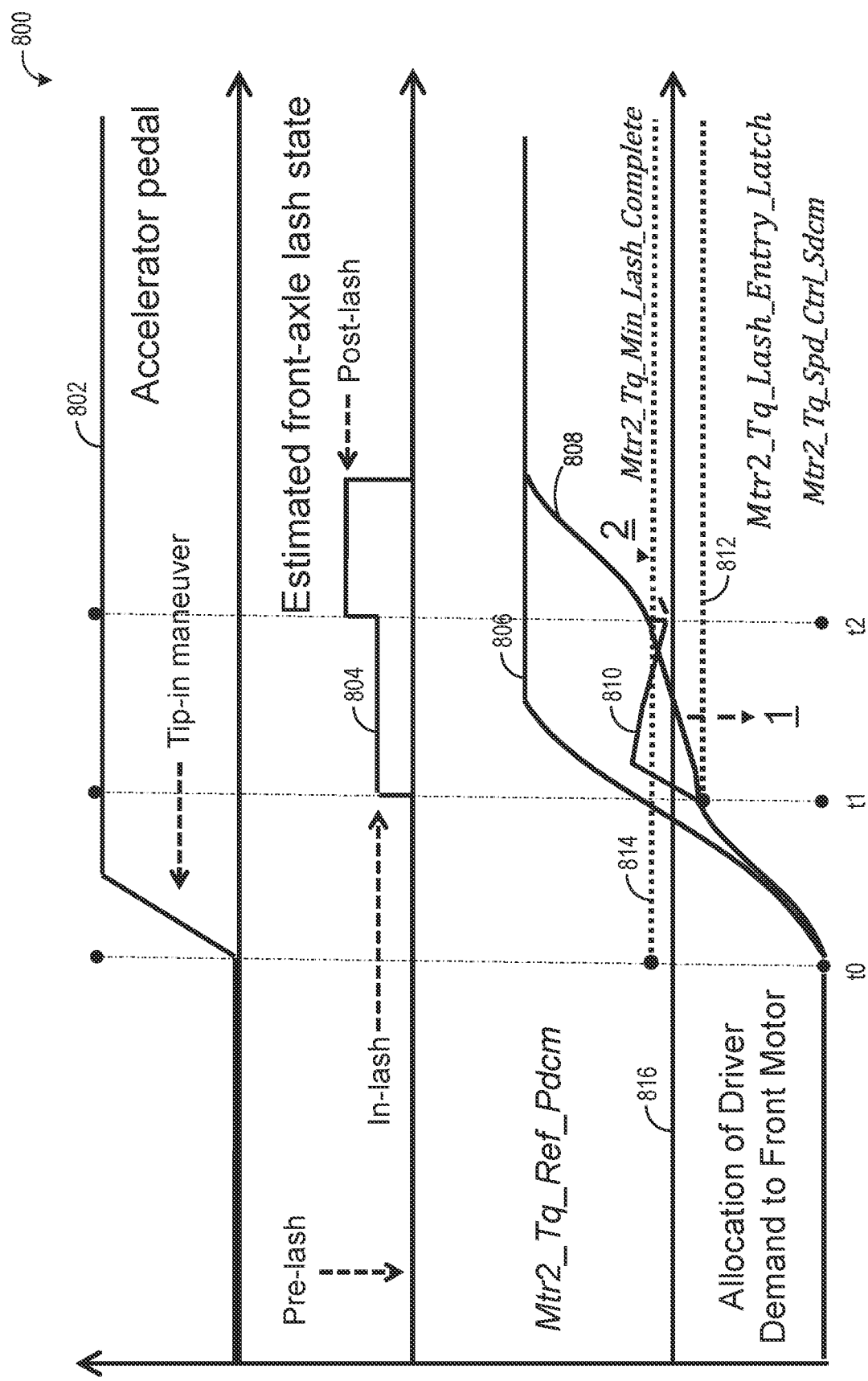
FIG. 8 is a timing diagram illustrating an example prophetic operation of the coordinated torque shaping control system for clunk and shuffle management.

The following description relates to systems and methods for a multi-motor, multi-axle electrified drivetrain of a vehicle, particularly for increasing drivability. Common nomenclature for battery electric vehicle drivetrain architecture denotes possible positions of an electric motor. One such architecture is 2-P4 arrangement allowing for four-wheel drive capability in which an electric motor is placed at each axle of the vehicle. An example schematic diagram of a 2-P4 electric drivetrain for a vehicle is given in FIG. 1. To manage potential clunk and the shuffle during a torque reversal, a coordinated torque shaping control strategy may be used that is distributed across a first electronic controller and a second electronic controller. As one example, the first electronic controller controls a first prime mover, e.g., a rear motor, and the second electronic controller controls a second prime mover, e.g., a front motor. The coordinated torque shaping control strategy is illustrated in FIG. 2. FIG. 3 is a state diagram for operating an aspect of the system described in FIGS. 1 and 2, and illustrating front motor torque control based on lash states of the front axle. In some examples, the transition from the in-lash to post-lash state may be herein referred to as crossing a lash zone or transitioning a lash zone. FIG. 4 is a flowchart of a first control routine, or routine 400, for operating the system described in FIGS. 1 and 2. FIG. 5 is a flowchart of a second control routine, or routine 500, for operating the system described in FIGS. 1 and 2 and may be implemented as a subroutine of FIG. 4. FIG. 6 is a flowchart of another control routine, or routine 600, for operating the system described in FIGS. 1 and 2 and may be implemented additionally or alternatively as a subroutine of FIG. 5. FIG. 7 and FIG. 8 are timing diagrams of prophetic examples of operating one or more of the control routines for coordinated torque shaping control system as described herein.

Figure 1:
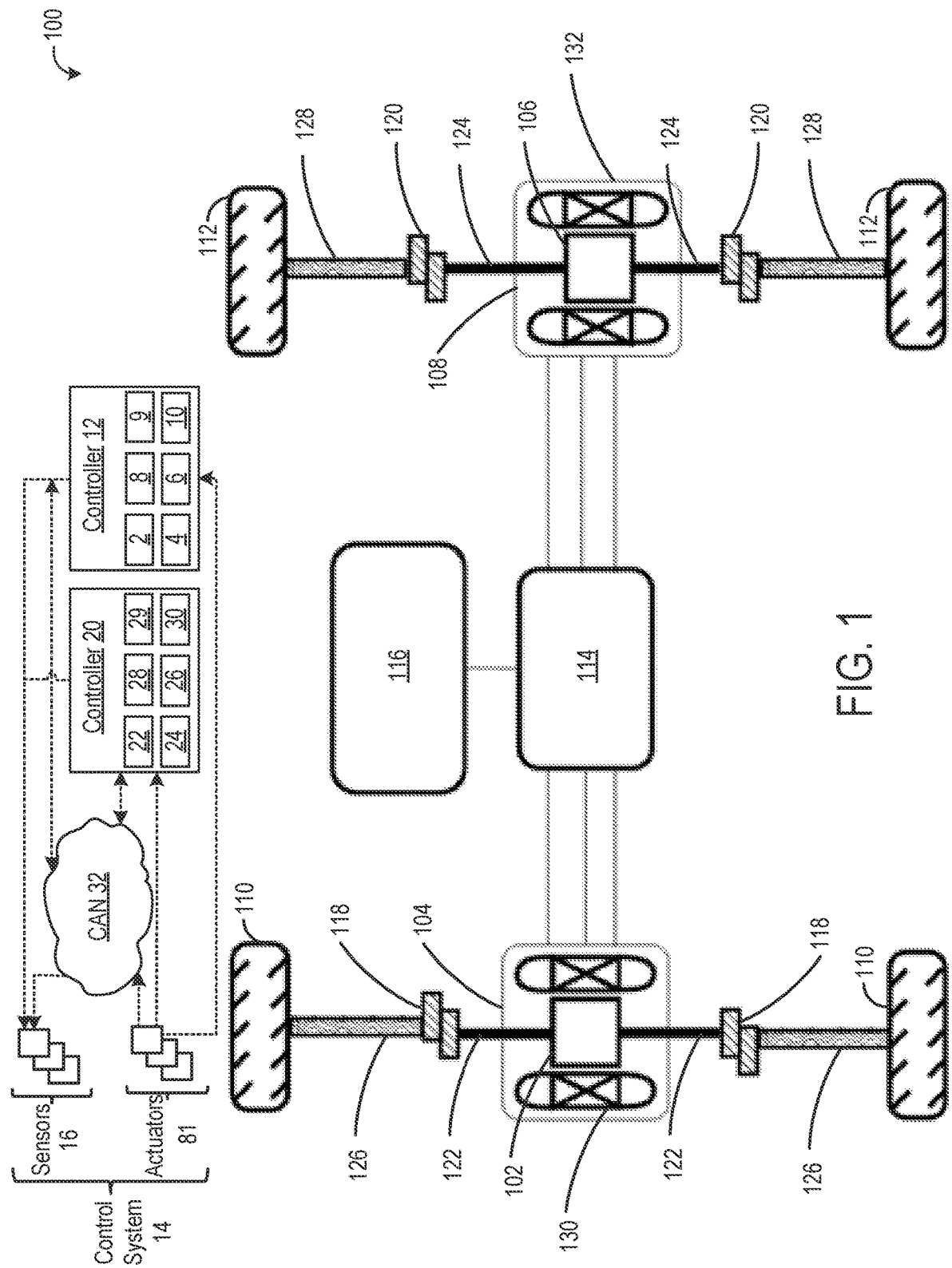
FIG. 1 is a schematic diagram of a drivetrain for an electric vehicle.

FIG. 1 is a schematic of an example drivetrain 100 for an electrical vehicle system. Drivetrain 100 is shown with a first prime mover (e.g., a propulsive force electric machine) or electric motor 106 for supplying a torque to a rear axle 108, a second prime mover (e.g., a propulsive force electric machine), or electric motor 102 for supplying a torque to a front axle 104. In one example, the front axle 104 and the rear axle 108 are separate. In other words, electric motor 102 does not supply torque to the rear axle 108 and electric motor 106 does not supply torque to the front axle 104. In one example, electric motors 102, 106 are independent. For example, electric motors 102, 106 have independently controlled torque and/or power and/or speed. In one example, electric motor 106 is controlled via a first electronic controller and electric motor 102 is controlled via a second electronic controller. In one example, the first electronic controller is positioned separately in the vehicle from the second electronic controller. For example, the first and second electronic controllers may be positioned in separate housings. In one example, electric motor 106 is controlled via a controller 12. In one example, electric motor 102 is controlled via a controller 20. Drivetrain 100 includes a communication area network (CAN). As one example, controller 12 and controller 20 communicate information over CAN 32.

Drivetrain 100 further includes front wheels 110 and rear wheels 112. In this example, front wheels 110 and/or rear wheels 112 may be driven via electric motors 102, 106. The rear axle 108 is coupled to electric motor 106. Electric motor 106 is shown incorporated into rear axle 108. The front axle 104 is coupled to electric motor 102. Electric motor 102 is shown incorporated into front axle 104. Electric motor 102 includes stator 130 and electric motor 106 includes stator 132. Electric motors 102, 106 may receive electrical power from power electronics assembly 114 and battery 116. In an example, battery 116 may be a 300 Voltage battery. Electric motor 102 may couple to front axle gear train 118 via front half shafts 122. Front wheels 110 may couple to front axle gear train 118 via front wheel shafts 126. Electric motor 106 may couple to rear axle gear train 120 via rear half shafts 124. Rear wheels 112 may couple to rear axle gear train 120 via rear wheel shafts 128.

Control system 14 includes controller 12, controller 20, CAN 32, the sensors 16, and the actuators 81. Control system 14 may communicate with one or more of electric motor 102, front axle gear train 118, electric motor 106, and rear axle gear train 120. Control system 14 may receive sensory feedback information from one or more electric motor 102, front axle gear train 118, electric motor 106, and rear axle gear train 120. Example sensors may detect front and rear motor speeds, front and rear motor torque, front and rear wheels speeds, and front and rear axle parameters. Further, control system 14 may send control signals to one or more of electric motor 102, front axle gear train 118, electric motor 106, rear axle gear train 120, etc., responsive to this sensory feedback. Control system 14 may receive an indication of an operator requested output (e.g., torque increase, decrease) of the drivetrain system from a human operator, or an autonomous controller. In one example, communication between the controller 12, the controller 20, the sensors 16, and actuators 81 may be conducted over the CAN 32. For example, the CAN 32 receives signals from the various sensors 16 and employs the actuators 81 to adjust drivetrain operation based on the received signals and instructions stored in a memory of one or more of the controllers of the vehicle system.

Controller 12 is shown as a conventional microcomputer including: microprocessor unit 2, input/output ports 4, read-only memory 6 (e.g., non-transitory memory) for executable programs (e.g., executable instructions) and calibration values shown as non-transitory read-only memory chip in this particular example, random access memory 8, keep alive memory 9, and a conventional data bus. Controller 12 may include an interface 10. Interface 10 may include a variety of interfaces, for example, one or more interfaces for users. Interface 10 may include data output devices. The interface 10 may facilitate the communication of system 200 described below with various communication and electronic devices. In an example, interface 10 may enable wireless communications between system 200 and one or more other computing devices (not shown). Similarly, controller 20 may be a conventional microcomputer including: microprocessor unit 22, input/output ports 24, read-only memory 26 (e.g., non-transitory memory) for executable programs (e.g., executable instructions) and calibration values shown as non-transitory read-only memory chip in this particular example, random access memory 28, keep alive memory 29, a conventional data bus, and an interface 30.

An electric vehicle system, in general, may experience undesirable clunk and shuffle events. Clunks may be caused by mechanical couplings within the drivetrain of the vehicle during tip-ins, tip-outs, or brake applications. In one example, relevant couplings may include couplings between the front axle gear train 118 of the front axle 104 and the front wheels 110 and couplings between the rear axle gear train 120 of the rear axle 108 and the rear wheels 112. When torque is reversed in drivetrain 100, lash causes the mechanical connections in the drivetrain to disengage then reengage in the opposite direction. This is called lash crossing. If this lash crossing transition happens too quickly or abruptly, there may be a noise, vibration, and harshness (NVH) disturbance when the couplings re-engage. Lash may refer to clearance or lost motion in a mechanism caused by gaps between the mating parts. Shuffle refers to the oscillations caused by the periodic twisting and untwisting of the shafts. In one example, relevant shafts may include front half shafts 122 between front axle gear train 118 and electric motor 102, rear half shafts 124 between rear axle gear train 120 and electric motor 106, front wheel shafts 126 between front wheels 110 and the front axle gear train 118, and rear wheel shafts 128 between rear wheels 112 and rear axle gear train 120. Shuffle oscillations may take place in the drivetrain even during scenarios wherein the backlash is not traversed. The clunk manifests as audible noise and the shuffle manifests as longitudinal vehicle jerking.

To manage clunk and shuffle events in a multi-motor, multi-axle electric drivetrain for an electric vehicle system, a controller may be configured to, in response to a torque reversal, transition the first prime mover and the second prime mover to cross a lash zone one before the other, where the lash zone of the second prime mover does not overlap with the lash zone of the first prime mover. As one example, coordination of the transition may be distributed to a first controller such as a rear motor controller, e.g., controller 12, and in-lash speed control of motor torque for the first prime mover and the second prime mover may be handled by their respective controllers, e.g., rear motor controller and front motor controller. As one example, the rear motor controller may shape and distribute allocated torques and determine a sequence of lash transition. As such, there may be minimal issues due to controller area network delay affecting the rear motor, however, in some examples, such delays may affect the front motor. For example, coordinating the transition for the front motor from a shaped torque command for in-lash speed control to a post-lash torque command may rely on CAN communication. Therefore, an additional consideration for clunk and shuffle management is the coordinated management of the transition from in-lash mode to a post-lash for the front motor. In some examples, managing the transition from in-lash to post-lash with additional front motor torque shaping control may reduce incidence of the front axle rebounding into the lash and may reduce NVH disturbance during tip-ins and tip-outs.

FIG. 2 shows a system 200 including a control strategy for rear axle and front axle lash state estimation, low pass filter for driver wheel torque demand, wheel torque shaping, and wheel torque distribution and motor torque shaping, and motor torque shaping during lash zone crossing. In FIG. 2, Mtr1 refers to a first prime mover, or first motor, coupled to a first axle (e.g., rear) and Mtr2 refers to a second prime mover, or second motor coupled to a second axle (e.g., front). System 200 may be a control unit such as controller 12 having a processing resource. The processing resource may include microprocessors, microcomputers, microcontrollers, digital signal processors, central processing units, state machines, logic circuitries, and/or any other devices that manipulate signals and data based on computer-readable instructions (e.g., microprocessor unit 2 in FIG. 1). The coordinated torque shaping control strategy illustrated in system 200 is distributed across a first electronic controller, shown as primary drive control module (PDCM) 216, and a second electronic controller, shown as secondary drive control module (SDCM) 218. The first and second electronic controllers may be the same or similar to first controller 12 and second controller 20. In one example, strategy blocks 1-7 may be applied in PDCM 216 and strategy blocks 8-9 may be applied in SDCM 218. Operations that may be affected by CAN delays are indicated by dashed lines.

In an example, data, such as that related to an analysis performed by system 200 may be stored in a storage device coupled to system. The storage device may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes (e.g., read-only memory 6 in FIG. 1). The storage device may store an activity data.

In an example, system 200 is in communication with interface 10 and interface 30 (shown in control system 14 in FIG. 1). Interface 10 and interface 30 may facilitate the communication of system 200 with various communication and electronic devices. In the rear axle and front axle lash state estimation, the state of the lash, e.g., pre-lash, or in-lash, or post-lash, is determined for each of the first and second axles, (e.g., the rear axle and the front axle) by computing the shaft displacement speed and the shaft twist. The inputs to rear axle lash state estimator determination computations are: rear motor speed, rear motor torque, rear wheels speeds, and rear axle parameters. The inputs to front axle lash state estimator determination computations are: front motor speed, front motor torque, front wheels speeds, and front axle parameters. Front and/or rear axle input parameter examples include stiffness, inertia, damping and so on. In an example, the computations may be carried out a Kalman filter may be applied to estimate the state of the lash. In one example, the PDCM 216 estimates the lash state of the rear motor and the SDCM 218 estimates the lash state of the front motor. The SDCM 218 communicates over the network (e.g., CAN 32) to the PDCM 216 the state of the lash for the front motor.

At 202, an unshaped driver wheel torque request is received. At 204, the wheel torque request is modified by a low pass filter (e.g., strategy block 1). The low pass filter is intended to prevent to prevent abrupt changes in the wheel torque demand, especially during scenarios involving abrupt and repeated changes in the accelerator pedal position by the driver. For instance, during scenarios involving low vehicle speeds and pedal busyness, low pass filtering may minimize unnecessary changes in the sign of the torque demand and, therefore, may minimize unwanted lash crossings.

At 206, the system shapes the low pass filtered wheel torque request (e.g., strategy block 2). In the wheel torque shaping, the system generates a shaped, e.g., rate-limited, version of the filtered driver demand, in response to the driver tip-ins and tip-outs. This shaping/rate limit takes into account: the urgency of tip-in/out and shuffle frequencies of the rear axle and the front axle. In one embodiment, the proposed system computes a frequency $f_{shuffle,min}$, given by:

$$f_{shuffle,min} = \min(f_{shuffle,rear}, f_{shuffle,front}), \quad (2.1)$$

where $f_{shuffle,rear}$ and $f_{shuffle,front}$ are the shuffle frequencies of the rear and front axles, respectively. Typically, these frequencies are obtained from vehicle tests and/or CAE models. Using this $f_{shuffle,min}$, the proposed system computes a ramp-rate, $rr_{shpd,wtq}$, for the shaped wheel torque command as:

$$rr_{shpd,wtq} = g \times \frac{Tq_{whl,dd,curr} - Tq_{whl,dd,init}}{T_{shuffle,min}}, \quad (2.2)$$

where: (a)

$$T_{shuffle,min} = \frac{1}{f_{shuffle,min}},$$

(b) $Tq_{whl,dd,curr}$ is the current value of the filtered driver torque demand; (c) $Tq_{whl,dd,init}$ is the initial value of the filtered driver torque demand, prior to the commencement of the shaping; and (d) g is a calibratable gain, which is scheduled as a function of the change in driver demand, e.g., $$g = g(Tq_{whl,dd,curr} - Tq_{whl,dd,init}). \tag{2.3}$$

This gain, g(•), is intended to increase or decrease the ramp rate based on the urgency of the tip-in/tip-out, e.g., when the magnitude of $Tq_{whl,dd,curr} - Tq_{whl,dd,init}$ is large, g is selected large, and when the magnitude of $Tq_{whl,dd,curr} - Tq_{whl,dd,init}$ is small, g is selected small.

At 208, based on a desired front-rear split of the driver demand, the filtered wheel torque request is distributed amongst the front motor and the rear motor (e.g., strategy block 3). The front-rear split may be allocated differently during lash crossing, e.g., in-lash, and during the transition from in-lash to post-lash, as compared to before, e.g., pre-lash, and after lash transition. Inputs to determining the front-rear split of driver demand torque request include the first motor lash state and the second motor lash state and may be communicated over the CAN.

At 210, the front motor torque and the rear motor torque are shaped such that each axle enters lash sequentially. In other words, the front and rear motors cross the lash zone one after another. In one example, shaped first motor torque (e.g., strategy block 4) brings the first axle through the lash followed by shaped second motor torque (e.g., strategy block 5) to bring the second axle through the lash. As one example, the sequence of lash crossing may be prioritized based on operating conditions or system specifications. For example, the axle that is allocated a larger portion of the driver demand may be prioritized to enter the lash first. Shaping may include torque compensation for the lash traversing motor by the other motor. In one example, the summation of the propulsive torques in the wheel domain may be equal to the shaped wheel torque demand. For example, when one of the axles is traversing lash, the ramp-rate of the motor of the other axle may increase above the torque command for a duration to compensate for the lash crossing. The compensating motor may be allowed to overshoot for a controlled duration (e.g., briefly) its allocation of the driver demand to provide torque during the lash crossing of the other axle. During sequential lash crossing, the strategy may include additional shaping for the torque command allocated to the second motor based on the transition state, e.g., pre-lash, in-lash, post-lash, to minimize lash rebound and jerk. For example, while traversing the lash, the torque command allocated to the second motor may be shaped based on a threshold torque, herein referred to as a lash exit threshold torque, and threshold duration calibrated to prevent rebound back into the lash. As another example, second motor torque may be shaped using a calibrated a feedforward gain to target the lash exit threshold torque, at the end of lash crossing.

At 212, the system includes assigning each axle a target speed of lash crossing. During in-lash speed control, the motor torque is shaped to track the target speed. As one example, the front and rear motors are operated in a torque control mode during lash crossing and otherwise. However, during the lash crossing, the motor torque is shaped such that the speed of lash traversal is regulated/controlled. The calibrations of the target speeds may take into account the driver urgency, tip-in or tip-out (e.g., flags), the requirement that each axle crosses lash sequentially, and the additional shaping for the second motor. In one example, the shaped motor torque command during the lash crossing can be computed as:

$$MTq_{in-lash,shpd} = k_{ff} \times \text{Speed}_{Target} + k_{fb} \times (\text{Speed}_{Target} - \text{Speed}_{Measured}), \tag{2.4}$$

where $k_{ff}$ and $k_{fb}$ are the feedforward and feedback control gains, respectively.

In some examples, the calculation (2.4) for shaped motor torque command may be applied to the first motor, e.g., the rear motor, and the second motor, e.g., the front motor. In other examples, additional shaping may be applied to the front motor. The notations shown in the table below are introduced to describe additional front motor (e.g., Mtr2 or second motor) shaping.

| Notation | Definition |
| --- | --- |
| Mtr2_Tq_Ref_Pdcm | Shaped/reference torque command allocated to front motor, received over CAN from PDCM |
| Mtr2_Tq_Arb_Sdcm | Arbitrated torque command for front motor, computed inside SDCM |
| Mtr2_Tq_Spd_Ctrl_Sdcm | Shaped torque command for front motor, computed to regulate the speed of lash crossing |
| Mtr2_Gain_Ff_Spd_Ctrl | Feedforward gain of Mtr2 in-lash mode speed controller |
| Mtr2_Gain_Fb_Spd_Ctrl | Feedback gain of Mtr2 in-lash mode speed controller |
| Mtr2_Spd_Trgt_Lash | Front axle speed-target for in-lash mode |
| Mtr2_Spd_Meas_Lash | Front axle measured speed of lash traversal |
| Mtr2_State_Est_Lash | Front axle estimated state of lash |
| Mtr2_Tq_Dd | Allocation of un-shaped driver demand torque to the front motor |

In an example without additional shaping through the transition from in-lash to post-lash, the front motor shaped torque command may be computed as:

$$\text{Mtr2\_Tq\_Arb\_Sdcm} = \begin{cases} \text{Mtr2\_Tq\_Ref\_Pdcm,} & \text{if (Mtr2\_State\_Est\_Lash == Pre-Lash)} \| \\ & \text{(Mtr2\_State\_Est\_Lash == Post-Lash); ,} \\ \text{Mtr2\_Tq\_Spd\_Ctrl\_Sdcm,} & \text{if (Mtr2\_State\_Est\_Lash == In-Lash)} \end{cases} \tag{2.5}$$

To manage the transition from in-lash to post-lash, the shaped/reference torque command allocated to the front motor, e.g., allocated torque command or Mtr2_Tq_Ref_Pdcrn, may be adjusted during lash crossing. The ramp-rate may be restricted such that Mtr2_Tq_Ref_Pdcrn takes a value equal to, or slightly larger than the minimum amount of torque estimated to reduce rebound back into the lash. As one example, Mtr2_Tqd_Ref_Slow_Pdcrn may be the ramp-rate of Mtr2_Tq_Ref_Pdcrn during the lash crossing and Mtr2_Tq_Min_Lash_Complete may be the calibratable minimum torque. In other words, the lash exit threshold torque. In one example, Mt2_Tq/Min_Lash_Complete may be calibrated based on one or more drive train properties, e.g., physical properties of the drivetrain, such as shaft stiffness and the size of lash in the gear train or differential. Then, in one example, the ramp-rate can be computed as:

$$Mtr2\_Tqd\_Ref\_Slow\_Pdcm = \\ (Mtr2\_Tq\_Min\_Lash\_Complete - \\ Mtr2\_Tq\_Lash\_Entry\_Latch) / \\ Mtr2\_T\_Lash\_Crossing, \quad (2.6)$$

where Mtr2_Tq_Lash_Entry_Latch is the value of Mtr2_Tq_Ref_Pdcm at the time of entry into the lash, and Mtr2_T_Lash_Crossing is the nominal, calibratable, time to complete the lash. In other words, the threshold duration. As one example, Mtr2_T_Lash_Crossing, or the lash transition threshold, may be calculated as a function of target lash crossing speed:

$$Mtr2\_T\_Lash\_Crossing = f(Mtr2\_Spd\_Trgt\_Lash). \quad (2.7)$$

As one example, using the above ramp-rate, the shaped/reference torque command allocated to the front motor may be computed as:

$$Mtr2\_Ta\_Ref\_Pdcm = Mtr2\_Tq\_Ref\_Pdcm\_Last + \\ (Mtr2\_Tad\_Ref\_Slow\_Pdcm \times Sample\_Time) \quad (2.8)$$

The transition from in-lash to post-lash for the front motor may include calibrating the feedforward gain to bring the speed controller output close to the Mtr2_Tq_Min_Lash_Complete, or the lash exit threshold torque, at the end of lash crossing. In one example, equation 2.4 above may be rewritten for the front motor as:

$$Mtr2\_Tq\_Spd\_Ctrl\_Sdcm = Mtr2\_Gain\_Ff\_Spd\_Ctrl \times \\ Mtr2\_Spd\_Trgt\_Lash + Mtr2\_Gain\_Fb\_Spd\_Ctrl \times \\ (Mtr2\_Spd\_Trgt\_Lash - Mtr2\_Spd\_Meas\_Lash). \quad (2.9)$$

Towards the end of the lash crossing, the value of the difference, Mtr2_Spd_Trgt_Lash−Mtr2_Spd_Meas_Lash, may be close to zero due to the action of the feedback portion of the controls. Given the influence of the behavior of the speed controller, the value taken towards the end of the lash crossing event may be influenced by the feedforward gain, Mtr2_Gain_Ff_Spd_Ctrl. In one example, the feedforward gain may be selected as:

$$Mtr2\_Gain\_Ff\_Spd\_Ctr = \\ ((Mtr2\_Ta\_Min\_Lash\_Complete - Cal\_Margin) / \\ Mtr2\_Spd\_Trgt\_Lash), \quad (2.10)$$

where Mtr2_Spd_Trgt_Lash may be calibrated to achieve an acceptable duration of time taken to complete the lash. Cal_margin may be a calibratable margin that may be selected to ensure that, at the end of the lash crossing event, the value take by Mtr2_Tq_Spd_Ctrl_Sdcm is lower than the threshold Mtr2_Tq_Min_Lash_Complete by a small margin.

At 214, each individual motor applies a damping torque, which, in some embodiments, could be computed using a lead-lag compensator or a lead compensator such as described in U.S. Pat. No. 9,446,757B2 and US patent application U.S. Ser. No. 16/521,885, respectively. As one example, damping torque may be adjusted using a damping function based on a difference between a measured motor speed and a desired motor speed, including a filter in a forward loop to restrict the damping to within a predefined range. The lead-lag compensator may include a feedback loop to generate motor torque adjustment, which may be subtracted from the desired motor torque to calculate a commanded motor torque. The inputs to these compensators are the drivetrain parameters (e.g., shaft stiffness, motor inertia, etc.), the wheels speeds, and the motors speeds. In other embodiments, the damping torque could be calculated by predictive controllers, such as MPC or RG.

At 220, shaped motor torque commands for front and rear axle sequential lash transitions are applied using feedback from separate, independent controllers for the first and second motors. In one example, first controller 222 controls a speed of lash transition for the first axle (e.g., rear) using feedback control from one or more sensors 224 of the first motor (e.g., RPM sensors, torque sensors). A second controller 228 controls the speed of lash transition for the second axle (e.g., front) using feedback control from one or more sensor 230 of the second motor. Electrical current 226, 232 may be adjusted (e.g., higher or lower) responsive to a threshold rate of change of motor RPM through the lash transition. In another example, first and second controllers control a rate of change of torque through the axle lash based sensor feedback from torque sensors.

The systems of FIG. 1 and FIG. 2 illustrate a coordinated torque shaping system including lash crossing transition management for multi-motor, multi-axle electrified drivetrains. The system filters and shapes wheel torque demand using front and rear axle parameters, motor speeds and wheel speeds to estimate lash states, and, in response to a torque reversal, coordinates the front axle and the rear axle to cross lash zones sequentially. The system includes in-lash to post-lash torque shaping for the front motor that may reduce issues related to communication area network (CAN) communication delays, such as lash rebound and jerk sometimes associated with the front axle lash transition in systems with distributed motor control. In this way, the BEV system may be easier for a vehicle operator to control, including reduced NVH, and may be subject to less degradation.

FIG. 3 shows a state diagram illustrating an example state machine 300 for lash crossing transition management in a coordinated torque shaping system for a two motor, four-wheel drive electric BEV, such as the example coordinated torque shaping system 200 described with respect to FIG. 1 and the example 2-P4 BEV described with respect to FIG. 1. The state machine may be included in a control system distributed across a first electronic controller and a second electronic controller, such as control system 14 described with respect to FIG. 1 and PDCM 216 and SDCM 218 described with respect to FIG. 2. The state machine may receive signals from sensors and adjust actuators of the BEV system, such as those described with respect to FIG. 1. In one example, in response to driver tip-in, the coordinated torque shaping system may transition between states of second motor torque shaping for the front axle based on an estimated lash state of the front axle.

The coordinated torque shaping system may transition to initializing the front-axle lash state estimator, or to an initialize state 302, in response to one or more sensor signals indicating vehicle start up. For example, an ignition signal or driving gear selection signal may be received by the control system, and in response to the vehicle start up indication, the control system may execute instructions stored in the memory of the control system to prepare the front axle lash state estimator function of the SDCM. In the initialize state, the control system may prepare to receive signals from the various sensors of the BEV system and to determine whether a driver acceleration request is indicated.

The coordinated torque shaping system may transition from the initialize state 302 to estimating and updating the front-axle lash state, or to an estimate state 304, in response to an indication of a driver tip-in. In the estimate state, the control system may receive signals from the various sensors of the 2-P4 BEV system and communicate the sensor signals to the SDCM, whereupon the SDCM may process the signals to estimate a front axle lash state. Sensor signals may be used to compute shaft displacement speed and shaft twist for the front axle from which the lash state may be estimated. Example inputs may include a front motor speed, front motor torque, front wheel speed, and other front axle parameters including stiffness, inertia, damping, and so on. While in the estimate state, the system may continuously estimate and update the front axle lash state and transition to a pre-lash, an in-lash, or a post-lash state based on the an output of the lash estimation computation.

The coordinated torque shaping system may transition from the estimate state 304 to shaping the second motor torque using Mtr2_Tq_Ref_Pdcrn, or pre-lash shaping state 306, in response to the system estimating the front axle in a pre-lash state. In one example, while in the pre-lash shaping state, the system may shape the torque command allocated to second motor based on tip-in urgency, front axle shuffle frequencies, and equations 2.1-2.3, such as described with respect to FIG. 2. In one example, the system may transition to the pre-lash state in response to sensor signals indicating an acceleration demand that may be provided without crossing lash. In another example, the system may transition to the pre-lash state in response to an acceleration demand that may be provided after a lash traverse. In one example, the coordinated torque shaping system may determine a sequence of lash traverse where the front axle crosses the lash after the rear axle. For the duration of the rear axle lash traverse, the second motor torque may be the shaped using the Mtr2_Tq_Ref_Pdcrn. The coordinated torque shaping system may continue to estimate and update the front axle lash state in response to sensor signals indicating shaping is not complete.

In one example, the coordinated torque shaping system may transition from the estimate state 304 to shaping the second motor torque using the pair of front motor in-lash shaping strategies, or the in-lash state 308, in response to the system estimating the front axle is in-lash. While in the in-lash state, the allocated torque command may be shaped using the additional front motor controls described with respect to FIG. 2, such as the equations 2.6-2.10. The in-lash front motor control may include adjusting the behavior of the shaped torque command by restricting the ramp rate such that that Mtr2_Tq_Ref_Pdcrn takes a value equal to or slightly larger than the minimum amount of torque required to prevent a rebound back into lash on the front axle. The in-lash motor control may also include calibrating the feedforward gain such that the output of the speed controller is close to the calibratable minimum torque at the end of the lash crossing to achieve an acceptable duration to complete the lash crossing. The coordinated torque shaping system may continue to estimate and update the front axle lash state in response to sensor signals indicating shaping is not complete.

The coordinated torque shaping system may transition from the estimate state 304 to shaping the second motor torque using Mtr2_Tq_Ref_Pdcrn, or post-lash shaping state 310, in response to the system estimating the front axle in a post-lash state. Similar to system operation in the pre-lash state, while in the post-lash state, the system may shape the torque command allocated to second motor based on tip-in urgency, front axle shuffle frequencies, and equations 2.1-2.3, such as described with respect to FIG. 2. The coordinated torque shaping system may transition to the end state upon receiving an indication that shaping is completed.

FIG. 4, FIG. 5, and FIG. 6 illustrate example control routines for coordinating lash crossing transitions in a multi-axle, multi-motor electric vehicle system according to at least some of the embodiments of the present disclosure. FIG. 4 sets up control strategies for implementing the system described in FIG. 1 and FIG. 2 for lash crossing transitions. In one example, tip-out torque shaping may be controlled based on operating conditions. For example, operating conditions may include a battery state of charge or a driver-selected driving mode. As one example, coordinated torque shaping through a lash transition during a tip-in may be controlled based on operating conditions such as a driver torque demand allocated to each axle, the driver-selected driving mode, and a lash state of the front axle. FIG. 5 illustrates a second control routine or routine 500 for coordinating and distributing torque including lash crossing transitions in a multi-motor, multi-axle electrified drivetrain. FIG. 6 illustrates a routine 600 for executing the coordinated lash crossing transitions during a tip-in. In some examples, FIG. 5 may be subroutines of FIG. 4. In some examples, FIG. 6 may be subroutine of FIG. 5. Instructions for carrying out control routine 400 and the rest of the control routines included herein may be executed by a control system having a first controller and a second controller in a communication network based on memory-stored instructions of the controllers and in conjunction with signals received from sensors of the drivetrain system, such as control system 14, CAN 32, controller 12, and controller 20, and sensors 16 described above with reference to FIG. 1 and FIG. 2. The control system may adjust actuators of the drivetrain system to adjust drivetrain operation, according to the routines described below.

At 402, routine 400 includes determining operating conditions. Operating conditions may include a position of an accelerator pedal (e.g., tip-in, tip-out), wheel torque demand, a driver or controller selected driving mode, road conditions (e.g., weather, terrain), front motor speed, rear motor speed, wheel speed, and so on.

At 404, routine 400 includes determining whether a tip-out is indicated. If a tip-out is not indicated, the routine continues to 412. At 412, the routine includes determining whether a tip-in is indicated. If a tip-in is indicated, at 414 the routine directs to FIG. 5, where coordinated torque shaping including lash crossing transition for positive torque demand is described in detail.

Returning to 404, if a tip-out is indicated, the routine continues to 406. At 406, routine 400 includes crossing zero torque with reduced lash compensation. In one example, crossing the lash during a tip-out may produce minimal clunk and the lash may be traversed without special shaping. In other examples, the routine may include reducing the rate of change of torque but the threshold limit may be set at a faster rate of change (negative) than the allowed limit during a positive tip-in rate of change when limiting torque through lash zone.

At 408, the routine includes determining negative torque demand allocation based on operating conditions. As one example, an operating condition may include a driver-selected or controller-selected driving mode such as sport and battery efficiency modes. For example, a driving mode may be selected by a driver prior to the tip-out by actuating a button. In response to a selection, such as sport mode, the controller may allocate torque to the front and rear motors in a manner that increases handling and responsive performance. In another example, driving mode may be determined by the controller, for example, based on operating conditions such as battery charge level, road conditions, and so on.

At 410, the routine includes distributing the negative torque demand based on operating conditions. In one example, negative torque demand may be distributed equally. In another example, the torque demand allocated to the first motor may remain positive and the second motor may provide the negative demand.

FIG. 5 illustrates routine 500 for coordinating and distributing torque including lash crossing transitions in a multi-motor, multi-axle electrified drivetrain. In one embodiment, routine 500 may be executed following an indication of a tip-in, such as described in routine 500. Additionally or alternatively, routine 500 may be executed during tip-in or tip-out for coordinating and distributing positive or negative torque demands, respectively. In the flow chart, dash lines indicate transfer of information from prior calculations to future calculations.

At 502, routine 500 includes filtering an unshaped driver wheel torque demand. The input to the shaping calculation is an unshaped driver wheel torque request at 504. As one example, the unshaped driver wheel torque request may be generated by a driver tip-in read by a pedal position sensor (e.g., one of sensors 16 in FIG. 1). As one example, filtering the raw pedal input may increase drivability by reducing the effect of pedal busyness and minimizing unnecessary lash crossings. The filtered driver wheel torque demand is shaped at 506. At 508, shaping calculation inputs include driver urgency, front and rear axle shuffle frequencies, and tip-in/out flags such as described with respect to FIG. 2. Wheel torque shaping incorporates operating conditions into a ramping rate with a calibratable gain. As one example, the ramping rate may include how quickly or slowly a torque demand is met. For example, when driver urgency is high, the ramp rate may increase torque to the demanded torque more quickly than when driver urgency is low.

At 510, the routine 500 includes estimating rear lash state and front lash state. During the estimation, driveline parameters, motor speeds and torques, and wheel speeds may be considered at 512. For example, the calculations for the state of the lash, e.g. pre-lash, in lash, post-lash, may be estimated with inputs including drivetrain parameters such as shaft stiffness and motor inertia, motor speeds and torques, and wheel speeds, such as described with respect to FIG. 2. At 514, the routine 500 includes communicating lash states via CAN. For example, the front lash state is communicated from the second electronic controller to the first electronic controller over the CAN.

At 516, the routine 500 includes distributing, shaping, and coordinating motor torques based on the shaped wheel torque demand calculated at 506. In one example, distributing the filtered wheel torque demand may include a torque distribution ratio between the front and rear motors. For example, torque may be distributed equally (e.g., 50:50 ratio) or non-equally (e.g., 20:80 ratio). In one example, distributing the torque may include determining sequential entry of the rear axle and the front axle into their respective backlash elements. Shaping may include compensating the axle that is crossing backlash using the motor of the other axle that has exit backlash. The front-rear distribution of driver demand may be split differently during lash transition as compared to before and/or after the transition. For example, the torque distribution ratio between the front and rear motors may be split equally before and after lash, and non-equally during sequential lash crossing. At 518, example inputs for determining the distribution, shape, and coordination of front and rear motor torques include desired front-rear split in distribution of driver demand, tip-in/tip-out flags, and the transition state of the front motor. As one example, the transition state of the front motor may influence front-rear motor torque distribution by determining when to make front motor specific adjustments, such as illustrated with respect to FIG. 3.

At 517, routine 500 includes determining whether the lash transition is indicated. Lash transition may be indicated based on the lash states calculated at 510 and communicated to the CAN at 514. If lash transitioning is indicated, at 520 the routine includes applying feedback controllers to track target lash crossing speeds (also herein referred to as threshold speeds). For example, the rear axle lash speed may be adjusted using a reference tracking speed controller that shapes the rear motor torque to transition the lash at a first threshold speed. The front axle lash speed may be adjusted using the reference tracking speed controller for the front motor and additional front axle-specific controls, such the in-lash to post-lash shaping described with respect to FIG. 3. For example, the speed controller may control the front motor torque to transition the lash at a second threshold speed and to maintain the second threshold speed for the threshold duration. As another example, the speed controller may target the lash exit threshold torque at the end of lash crossing. Feedback control at 520 enables modifying and adapting lash crossing and in-lash to post-lash state transition to present and/or evolving operating conditions that may affect the drivetrain system. At 522, inputs to the feedback controllers include motor and wheel speeds, lash crossing target speeds, tip-in/out flags. If lash transition is not indicated, routine 500 includes communicating shaped torque commands to motors via CAN at 524. In one example, routine 500 may direct to FIG. 6 where routine 600 illustrates example sequential lash crossing commands including coordinating the transition from in-lash to post-lash state for the front axle during an accelerator tip in.

FIG. 6 illustrates an example routine 600 for transitioning the front motor and rear motor to cross a lash zone one before the other including control of the transition from in-lash to post-lash for the front axle. In one example, routine 600 may be a subroutine of routine 500 for communicating shaped torque commands to motors via CAN in FIG. 5. In one example, the rear motor may be the first motor to cross the lash. The rear motor, or first motor, torque is shaped to gently transition the rear axle lash. Once through, the front motor may be the second motor to cross the lash while the rear motor provides compensatory torque through the transition. The front motor lash crossing includes additional controls based on operating parameters to reduce incidence of lash rebound and jerk that in some examples may be associated with the front axle lash transition from the in-lash to post-lash state.

At 602, routine 600 includes receiving the allocation of driver demand torque to the front and rear motors. In one example, the allocation to the front and rear motors may be based on operating conditions such as motor torque rating, road conditions, estimated state of lash, and so on.

At 604, routine 600 includes receiving in-lash speed controller thresholds for front and rear motors. In one example, the in-lash motor torques may be shaped to target the in-lash speed control thresholds using feedforward and feedback control gains. For example, a first threshold speed for the rear motor in-lash speed control may be determined based on inputs including driver urgency and the sequence of axle lash crossing, e.g., crossing lash first. In one example, the second threshold speed, the threshold duration, and the lash exit threshold torque for the front motor may be operating parameters for front-motor specific in-lash adjustment. For example, the operating parameters may be determined according to the equations 2.5 through 2.10 described with respect to FIG. 2. In one example, the second threshold speed calculation may incorporate a ramp rate that is calibrated to be greater than the threshold torque to prevent rebound back into the lash, herein referred to as the lash exit threshold torque. As another example, the second threshold speed calculation may include a calibration to ensure an acceptable duration to complete the lash crossing event, herein referred to as the threshold duration.

At 606, routine 600 includes determining whether the rear axle is in the in-lash state. As described with respect to FIG. 2, in one example, determining whether the rear axle is in the lash may include rear axle lash state estimator using driveline parameters, motor speeds, motor torques, and wheel speeds as inputs to compute the shaft displacement speed and the shaft twist. If the rear axle is in the lash, routine 600 continues to 608. Otherwise, the rear axle lash state estimator may continue to estimate and update the rear axle lash state.

At 608, routine 600 includes gently transitioning the rear motor through the lash at the first threshold speed. Through the lash, feedback control may be applied to the rear motor torque to track the first threshold speed. The torque may be adjusted by comparing the first threshold speed (e.g., target) to the actual speed. At 610, routine 600 includes determining whether the rear axle is in the post-lash state. If not, speed control of the motor torque through the lash continues. If the rear axle state is post-lash, routine 600 continues to 612.

At 612, routine 600 includes ramping the rear motor to the allocated rear motor torque command plus compensatory torque for the front motor lash transition. For example, the rear motor torque may temporarily exceed the allocated rear motor torque command during the front axle lash transition.

At 614, routine 600 includes determining whether the front axle is in the in-lash state. The front axle lash state estimator may, similarly, use driveline parameters, motor speeds, motor torques, and wheel speeds as inputs to compute the shaft displacement speed and the shaft twist. If the front axle is in the lash, routine 600 continues to 616. In one example, the method may include commanding the front motor in speed control responsive to the indication of the front axle in the lash zone. Otherwise, the front axle lash state estimator may continue to estimate and update the front axle lash state, and maintain command of the front motor in motor torque control.

At 616, routine 600 includes gently transitioning the front motor through the lash at the second threshold speed for the lash transition duration threshold. Through the lash, feedback control may be applied to the front motor torque to track the second threshold speed. The torque may be adjusted by comparing the second threshold speed (e.g., target) to the actual speed. At 618, routine 600 includes determining whether the threshold duration is met. If the threshold duration is not met, the routine includes maintaining control of the front motor torque at the second threshold speed. If the threshold duration is met, routine 600 continues to 620.

At 620, the routine 600 includes applying the calibrated feedforward gain to complete the lash transition at the lash exit threshold torque. The calibrated feedforward gain applied at the end of the lash transition reduces the difference between the front motor torque and the shaped/reference torque command allocated to the front motor for a smooth transition into the post-lash state.

At 622, the routine includes determining whether an indication of greater than the lash exit threshold torque for the front motor is received. As one example, the front motor having greater than lash exit threshold torque may indicate that the front axle has transitioned the lash, or in other words, the front motor is in the post-lash state. As such, the front motor torque may be shaped using the shaped/reference torque command allocated to the front motor, such as described with respect to FIG. 3. If the front motor torque is not greater than the lash exit threshold torque, the routine continues to apply calibrated feedforward gain to complete the lash transition at the lash exit threshold torque. If the front motor torque is greater than the lash exit threshold torque, at 624 the routine may include ramping the front motor and rear motors to their respective allocated shaped/reference torque commands.

FIG. 7 and FIG. 8 are timing diagrams illustrating a sequence of actions performed within a control routine for shaping motor torque during a lash transition for an exemplary 2-P4 BEV drivetrain system. The control routine for motor torque shaping may be the same as or similar to the series of actions described above with reference to routines 400, 500, and 600 in FIGS. 4-6, respectively. The 2-P4 BEV drivetrain system may be the same or similar to drivetrain 100 shown in FIG. 1. Instructions for performing the control routines described in timing diagram 700 and timing diagram 800 may be executed by a control system (e.g., control system 14) having distributed control based on memory-stored instructions of the controllers of the system (e.g., controller 12, controller 20) and in conjunction with sensory feedback received from components from the vehicle drivetrain system, including front and rear motor speed sensors, front and rear motor torque sensors, front and rear wheel speed sensors, and a pedal position sensor (e.g., sensors 16) described above with reference to FIG. 1. In the prophetic examples, the control system determines a tip-in is indicated and in response coordinates front and rear motor torque shaping through the lash transition.

Timing diagram 700 of FIG. 7 shows plots 702, 704, 706, 708, and 710, which illustrate states of components and/or control settings of the drivetrain system over time. Plot 702 indicates an accelerator pedal position. Decreasing accelerator pedal position indicates a driver accelerator tip-out. Increasing accelerator pedal position indicates a driver accelerator tip-in. Plot 704 indicates a state of the rear axle lash as determined by the rear axle lash state estimator. The rear axle may be in one of a pre-lash, in-lash, and post-lash state. Plot 706 indicates a state of the front axle lash as determined by the front axle lash state estimator. The front axle may be in one of a pre-lash, in-lash, and post-lash state. Plot 708 indicates the rear motor torque. Plot 710 indicates the front motor torque. Rear motor torque and front motor torque may be positive or negative. Torque demand may be distributed or allocated to the front motor and the rear motor based on the coordinated torque shaping strategy. Example thresholds are indicated in dashing. An allocated rear motor torque command threshold 712 is indicated on plot 708. A pre-lash, allocated front motor torque command threshold 714, a lash exit threshold torque 716, and a post-lash, allocated front motor torque command threshold 718 are indicated on plot 710. The horizontal (x-axis) denotes time and the vertical markers t0-t5 identify relevant times in timing diagram 700 of FIG. 7 for coordinated motor torque shaping.

At t0, the accelerator pedal is in a tip-out position as shown in plot 702. The rear and front axle lash state estimators determine the front and rear axles are in the pre-lash state. The torque demand is distributed between the front and rear motors as shown in plots 708 and 710, respectively. Torque demand allocated to the front motor torque is greater than the torque demand allocated to the rear motor. From t0 to t1, the accelerator pedal position indicates a tip in. Torque demand allocated to the rear and front motors increases in the direction of the zero torque point as shown in plots 708 and 710.

At t1, the accelerator pedal tip-in levels off to a positive torque demand. The torque demand is distributed, shaped, and coordinated between the rear and front motors as follows. The rear motor torque command for speed control will target a first threshold speed to transition the lash first from t1 to t2. For example, the first threshold speed may be calibrated to bring the rear motor through the zero torque point with minimal clunk and shuffle at the same time providing the commanded torque responsive to driver urgency. The positive torque demand following lash transition is distributed to the rear motor as the allocated rear motor torque command threshold 712 and to the front motor as the post-lash, allocated front motor torque command threshold 718. While the front motor transitions the lash, the rear motor will provide compensatory torque, e.g., more than the threshold 712. The pre-lash, allocated front motor torque command threshold 714 and lash exit threshold torque 716 are set for the front motor. For the front motor lash transition, the front motor torque command for speed control uses the threshold 714 and lash exit threshold torque 716 to calculate a second threshold speed. The second threshold speed calculation may include a calibration to ensure an acceptable duration to complete the lash crossing event, herein referred to as the transition threshold duration, e.g., from t2 to t3. After the coordinated lash transition, the rear motor will ramp to the allocated rear motor torque command threshold 712 and the front motor will ramp to the allocated front motor torque command threshold 718. The rear axle lash state estimator indicates the rear axle is in the in-lash state and the front axle lash estimator indicates the front axle is in the pre-lash state.

From t1 to t2, the rear motor gently crosses the lash at the first threshold speed. Through the lash, feedback control is applied to the rear motor torque to track the first threshold speed. The torque is adjusted by comparing the first threshold speed to the actual speed. The front motor torque increases and holds at the pre-lash, allocated front motor torque command threshold 714. At t2, the axle lash state estimators estimate the rear motor is in the post-lash state and the front motor is in the in-lash state.

From t2 to t3, the rear motor ramps to the allocated rear motor torque command threshold 712 plus an overshoot amount to provide for the lash crossing of the front motor. The front motor crosses the lash while targeting the second threshold speed for the threshold duration, e.g., from t2 to t3. At t3, calibrated feedforward control is applied to the front motor to target the lash exit threshold torque 716 as the front motor transitions from the in-lash to post-lash state.

At t4, the axle lash state estimators estimate the front axle and the rear axle are in the post-lash state. From t4 to t5, the rear motor torque is ramped down to the allocated rear motor torque command threshold 712 and the front motor torque is ramped up to the post-lash, allocated front motor torque command threshold 718. At t5, the desired front-rear torque distribution is achieved.

As another example, timing diagram 800 illustrates a front axle lash transition. Timing diagram 800 of FIG. 8 shows plots 802, 804, 806, 808, and 810, which illustrate states of components and/or control settings of the drivetrain system over time. Plot 802 indicates an accelerator pedal position. Decreasing accelerator pedal position indicates a driver accelerator tip-out. Increasing accelerator pedal position indicates a driver accelerator tip-in. Plot 804 indicates a state of the front axle lash as determined by the front axle lash state estimator. Plot 806 indicates an allocation of driver demand to the front motor. Plot 808 indicates the front motor shaped torque command including additional shaping calculations, marked by indicators "1" and "2". For reference, plot 810 indicates the front motor speed control through the lash without additional shaping. Indicator 816 is the zero torque point for the front motor. Values of plot 806, plot 808, and plot 810 above indicator 816 are positive and values below indicator 816 are negative. Example thresholds are indicated in dashing. A second motor lash entry threshold torque 812 is indicated and may be the same or similar to the pre-lash, allocated front motor torque command threshold. In other words, the value of the allocated front motor torque command at the time of entry into the lash such as described with respect to FIG. 2. A second motor minimum lash complete threshold torque 814 is indicated and may be the same or similar to the lash exit threshold torque. In other words, the threshold torque calibrated to reduce front axle rebound back into the lash such as described with respect to FIG. 2. The horizontal (x-axis) denotes time and the vertical markers t0-t2 identify relevant times in timing diagram 800 of FIG. 8 for coordinated motor torque shaping.

At t0, the accelerator pedal indicates a tip-out. The negative torque demand is allocated to the front motor. The estimated front axle lash state is pre-lash.

From t0 to t1, a tip in maneuver is detected. A portion of the driver demand torque is allocated to the front motor. To fulfil the positive torque demand, the front axle may cross the lash. For example, the front axle may cross the lash at a second threshold speed after the lash transition is executed by the rear axle at a first threshold speed. At t1, the front axle lash estimator estimates the front axle is in the in-lash state. The second threshold speed and the transition threshold duration are calculated using the second motor lash entry threshold torque 812 and the second motor minimum lash complete threshold torque 814.

From t1 to t2, the speed controller targets the second threshold speed to transition from in-lash to post-lash for the threshold duration. Without additional shaping through the lash, as shown in plot 810, the shaping may produce a steeper lash transition, potentially increasing incidence of shuffle and jerk during the transition from the in-lash to the post-lash state. With the additional shaping including calibrating the feedforward gain to reduce the difference between the front motor torque and the shaped/reference torque at the end of the lash crossing event, undesirable rebound and jerk may be minimized.

In this way, the methods and system described herein operate a coordinated and distributed control strategy for shaping front and rear motor torques to manage torque disturbances arising out of varying amounts of lash and compliance distributed across front and rear axles of a multi-motor, multi-axle drivetrain such as 2-P4 or power-split with EFAD/ERAD configurations. The strategy includes front motor specific controls for reducing incidence of lash rebound and jerk sometimes accompanying the front axle in-lash to post-lash transition that may be produced by CAN delays. By adjusting the behavior of the shaped/reference torque command for the front motor during the front axle lash transition, the reference signal provided at the end of the lash crossing event is set to a lash exit threshold torque that may be greater than the minimum amount of torque to prevent rebound into the lash. By calibrating the feedforward gain towards the end of the lash crossing (e.g., after a threshold duration), the output of the speed controller may be closer to the lash exit threshold torque, thereby reducing the difference between the front motor torque and the shaped/reference torque command at the end of the lash crossing event. The shaping strategies help reduce the frequency of the front axle being subject to rebound, jerk, and other undesirable forces during the transition of the front axle from in-lash mode to post-lash mode. The technical effect for a coordinated torque shaping system for lash crossing transition management in a multi-motor, multi-axle drivetrain is increased drivability and reduced torsional wear on the drivetrain.

The disclosure also provides support for a method for an electric vehicle having a first prime mover for supplying a torque to a first axle and a second prime mover for supplying the torque to a second axle, comprising: transitioning the first prime mover and the second prime mover to cross a lash zone one before the other, where the lash zone of the second prime mover does not overlap with the lash zone of the first prime mover. In a first example of the method, the first prime mover is controlled with a first electronic controller and the second prime mover is controlled with a second electronic controller positioned separately in the electric vehicle from the first electronic controller. In a second example of the method, optionally including the first example, the method further comprises communicating information from the first electronic controller to the second electronic controller via a communication area network. In a third example of the method, optionally including one or both of the first and second examples, a lash state of the second prime mover is communicated to the first electronic controller and an allocated torque command for the second prime mover is communicated to the second electronic controller. In a fourth example of the method, optionally including one, more, or each of the first through third examples, during lash zone of the second prime mover, shaping the allocated torque command for the second prime mover to achieve a lash exit threshold torque. In a fifth example of the method, optionally including one or more or each of the first through fourth examples, after the lash zone of the second prime mover, applying the allocated torque command to the second prime mover. In a sixth example of the method, optionally including one or more or each of the first through fifth examples, transitioning includes responsive to an indication of the first prime mover in the lash zone adjusting a motor torque of the first prime mover to target a first threshold speed of lash crossing. In a seventh example of the method, optionally including one or more or each of the first through sixth examples, the transitioning includes responsive to an indication of the second prime mover in the lash zone adjusting a motor torque of the second prime mover to target a second threshold speed of lash crossing. In an eighth example of the method, optionally including one or more or each of the first through seventh examples, the transitioning includes responsive to an indication of the second prime mover maintaining a second threshold speed for greater than a threshold duration, adjusting a motor torque of the second prime mover to target a lash exit threshold torque using a feedforward gain calibrated to target the lash exit threshold torque. In a ninth example of the method, optionally including one or more or each of the first through eighth examples, the transitioning includes a rear motor crossing the lash zone before a front motor.

The disclosure also provides support for a method for a drivetrain system having a first prime mover for supplying a torque to a first axle and a second prime mover for supplying a torque to a second axle, comprising: transitioning the first axle and the second axle to cross lash zones sequentially, where a lash zone of the second prime mover does not overlap with the lash zone of the first prime mover and the lash zone of the first prime mover occurs before the lash zone of the second prime mover, and during a lash transition for the second axle, adjusting the first prime mover based on receiving communication over a network of whether the second prime mover is in the lash zone. In a first example of the method, the first prime mover is controlled with a first electronic controller and the second prime mover is controlled with a second electronic controller positioned separately from the first electronic controller, and wherein the first electronic controller and the second electronic controller communicate over the network. In a second example of the method, optionally including the first example, a lash state of the second prime mover is communicated from the second electronic controller to the first electronic controller and an allocated torque command for the second prime mover is communicated from the first electronic controller to the second electronic controller. In a third example of the method, optionally including one or both of the first and second examples, the allocated torque command for the second prime mover is shaped to achieve a lash exit threshold torque.

The disclosure also provides support for an electric vehicle system comprising: a first prime mover for supplying a torque to a first axle, a second prime mover for supplying a torque to a second axle, a first electronic controller for controlling the first prime mover, a second electronic controller for controlling the second prime mover positioned separately in the electric vehicle system from the first electronic controller, and the first controller and the second controller configured to transition the first prime mover and the second prime mover to cross a lash zone one before the other, where the lash zone of the second prime mover does not overlap with the lash zone of the first prime mover, wherein the first electronic controller communicates to the second electronic controller an allocated torque command for the second prime mover and the second electronic controller communicates to the first electronic controller a lash state of the second prime mover. In a first example of the system, the transition includes adjusting a motor torque of the first prime mover to target a first threshold speed of lash traversal and adjusting the motor torque of the second prime mover to target a second threshold speed of lash traversal. In a second example of the system, optionally including the first example, the transition for the second prime mover includes shaping the allocated torque command for the second prime mover to achieve a lash exit threshold torque. In a third example of the system, optionally including one or both of the first and second examples, the transition for the second prime mover includes applying a feedforward gain to target a lash exit threshold torque. In a fourth example of the system, optionally including one or more or each of the first through third examples, the lash zone is determined by an axle lash state estimator. In a fifth example of the system, optionally including one or more or each of the first through fourth examples, the first axle, and the second axle are independent of one another.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric vehicle having a first prime mover for supplying a torque to a first axle and a second prime mover for supplying the torque to a second axle, comprising:
transitioning the first prime mover and the second prime mover to cross a lash zone one before the other, where the lash zone of the second prime mover does not overlap with the lash zone of the first prime mover,
wherein the transitioning includes, responsive to an indication of the second prime mover maintaining a second threshold speed for greater than a threshold duration, adjusting a motor torque of the second prime mover to target a lash exit threshold torque using a feedforward gain calibrated to target the lash exit threshold torque.

2. The method of claim 1, wherein the first prime mover is controlled with a first electronic controller and the second prime mover is controlled with a second electronic controller positioned separately in the electric vehicle from the first electronic controller.

3. The method of claim 2, further comprising communicating information from the first electronic controller to the second electronic controller via a communication area network.

4. The method of claim 3, wherein a lash state of the second prime mover is communicated to the first electronic controller and an allocated torque command for the second prime mover is communicated to the second electronic controller.

5. The method of claim 4, wherein during lash zone of the second prime mover, shaping the allocated torque command for the second prime mover to achieve the lash exit threshold torque.

6. The method of claim 5, wherein after the lash zone of the second prime mover, applying the allocated torque command to the second prime mover.

7. The method of claim 1, wherein transitioning includes responsive to an indication of the first prime mover in the lash zone adjusting the motor torque of the first prime mover to target a first threshold speed of lash crossing.

8. The method of claim 1, wherein the transitioning includes responsive to an indication of the second prime mover in the lash zone adjusting the motor torque of the second prime mover to target the second threshold speed of lash crossing.

9. The method of claim 1, wherein the transitioning includes a rear motor crossing the lash zone before a front motor.

10. A method for a drivetrain system having a first prime mover for supplying a torque to a first axle and a second prime mover for supplying a torque to a second axle, comprising:
transitioning the first axle and the second axle to cross lash zones sequentially, where a lash zone of the second prime mover does not overlap with the lash zone of the first prime mover and the lash zone of the first prime mover occurs before the lash zone of the second prime mover; and
during a lash transition for the second axle,
adjusting the first prime mover based on receiving communication over a network of whether the second prime mover is in the lash zone;
wherein the transitioning includes, responsive to an indication of the second prime mover maintaining a second speed for greater than a duration, adjusting a motor torque of the second prime mover to target a lash exit torque using a feedforward gain calibrated to target the lash exit torque.

11. The method of claim 10, wherein the first prime mover is controlled with a first electronic controller and the second prime mover is controlled with a second electronic controller positioned separately from the first electronic controller, and
wherein the first electronic controller and the second electronic controller communicate over the network.

12. The method of claim 11, wherein a lash state of the second prime mover is communicated from the second electronic controller to the first electronic controller and an allocated torque command for the second prime mover is communicated from the first electronic controller to the second electronic controller.

13. The method of claim 12, wherein the allocated torque command for the second prime mover is shaped to achieve the lash exit torque.

14. An electric vehicle system comprising:
a first prime mover for supplying a torque to a first axle;
a second prime mover for supplying a torque to a second axle;
a first electronic controller for controlling the first prime mover;
a second electronic controller for controlling the second prime mover positioned separately in the electric vehicle system from the first electronic controller, and
the first electronic controller and the second electronic controller configured to transition the first prime mover and the second prime mover to cross a lash zone one before the other, where the lash zone of the second prime mover does not overlap with the lash zone of the first prime mover,
wherein the first electronic controller communicates to the second electronic controller an allocated torque command for the second prime mover and the second electronic controller communicates to the first electronic controller a lash state of the second prime mover; and wherein the transition for the second prime mover includes, responsive to an indication of the second prime mover maintaining a second speed for greater than a duration, adjusting a motor torque of the second prime mover to target a lash exit torque using a feedforward gain calibrated to target the lash exit torque.

15. The electric vehicle system of claim 14, wherein the transition includes adjusting a motor torque of the first prime mover to target a first threshold speed of lash traversal and adjusting the motor torque of the second prime mover to target a second threshold speed of lash traversal.

16. The electric vehicle system of claim 14, wherein the transition for the second prime mover includes shaping the allocated torque command for the second prime mover to achieve the lash exit torque.

17. The electric vehicle system of claim 14, wherein the lash zone is determined by an axle lash state estimator.

18. The electric vehicle system of claim 14, wherein the first axle and the second axle are independent of one another.

* * * * *